UNITED STATES PATENT OFFICE.

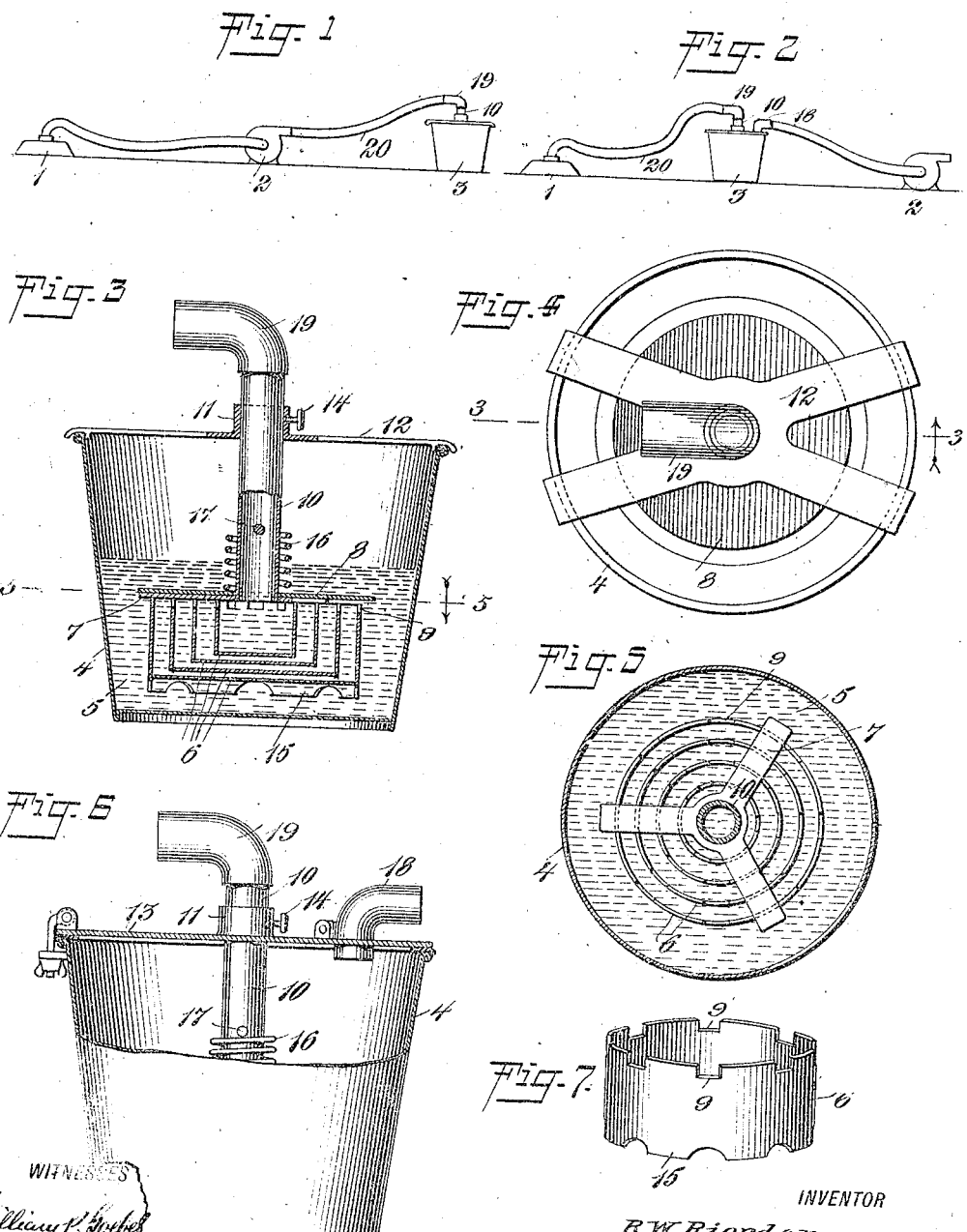

ROBERT WHITING RIORDAN, OF NEW YORK, N. Y.

DUST-SEPARATOR.

1,188,834.  Specification of Letters Patent.  Patented June 27, 1916.

Application filed April 19, 1916. Serial No. 92,145.

*To all whom it may concern:*

Be it known that I, ROBERT W. RIORDAN, a citizen of the United States, and a resident of the city of New York, borough of Brooklyn, in the county of Kings and State of New York, have invented a new and Improved Dust-Separator, of which the following is a full, clear, and exact description.

This invention relates to a dust separator especially adapted for, although not necessarily limited to, vacuum cleaners.

The invention has for its general objects to improve the construction and operation of apparatus of the character referred to so as to be reliable and efficient in use, comparatively simple and inexpensive to manufacture, and so designed as to permit of the easy and sanitary separation of dust from air.

A more specific object of the invention is the provision of a dust separator which can be placed in an ordinary pail or bucket and submerged in water, whereby the dust-laden air is caused to pass through the water by the special construction of the device for the elimination of the dust particles from the air, the separator being so constructed that it can be easily and quickly cleaned without the disagreeable features common to dust bags or receptacles now in use, and since the dust is taken up by the water the mere emptying of the pail or the bucket disposes of the dirt.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a side view of a vacuum cleaner and dust separator, the suction-producing device or blower being intermediate the vacuum nozzle and the dust separator; Fig. 2 is a similar view of a modification in which the separator is between the vacuum nozzle and the blower or suction-producing device; Fig. 3 is an enlarged sectional view of the dust separator, the section being taken on the line 3—3, Fig. 4; Fig. 4 is a plan view of the dust separator; Fig. 5 is a horizontal section on the line 5—5, Fig. 3; Fig. 6 is a modified form of dust separator; and Fig. 7 is a perspective view of one of the cylinders which go to make up the dust separator.

Referring to the drawing, 1 designates the nozzle of a vacuum cleaner, 2 the fan, pump or other suction-producing device, and 3 the separator, the latter being arranged on the discharge side of the fan or pump, as shown in Fig. 1, or on the suction side, as shown in Fig. 2.

The separator is so designed that the dust is continuously separated from the air by the dust-laden air being forced through a body of water, whereby the air escapes to the atmosphere and the particles are arrested by the water. The separator comprises a pail 4 that contains water 5 to a suitable depth, and submerged in the water is a separating device composed of a plurality of nested cylinders 6 concentrically arranged and secured together by a spider 7, and over the cylinders is a disk or cover 8 which may be solid or perforated. The upper edges of the cylinders have spaced ports 9 whereby air can freely pass outwardly from the central cylinder successively to the outer one. The spider or frame 7 is fastened to the lower end of a pipe 10 which passes through a hub 11 in a supporting frame 12, as shown in Figs. 3 and 4, or in a covered plate 13, as shown in Fig. 6. The position of the dust-separating device in the pail may be varied by sliding the pipe 10 up or down in the hub 11, and when the desired position is attained the set-screw 14 is tightened. The separating device can rest on the bottom of the pail, and to insure proper circulation of the water the bottom edge of the outer cylinder has a notched flange 15, so that water can circulate under it.

The disk or cover 8 is held seated by a spring 16 surrounding the pipe 10, the upper end of the spring bearing against an abutment 17, and the lower end bearing against the cover to urge the latter downwardly. This means of holding the cover yieldingly closed is advantageous, as it enables the cover to be easily held in open position in case it is desired to run water into the cylinders from a faucet or nozzle in washing out the lint that might collect on the cylinders. The frame 12 allows the top of the pail to be open so that the air can freely escape, as when the device is used on the discharge side of the suction-producing device 2, as shown in Fig. 1. When it is used on the suction side, as shown in Fig. 2, the cover 13 is clamped closed in air-tight relation to the pail, as shown in Fig. 6. The cover 13 also has an elbow 18 for connection with the suction-producing device. At the top of the pipe 10 is an elbow or other swiveled coupling 19 to which is connected the hose 20 through which the dust-laden air passes to the separator.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A portable dust separator for vacuum cleaners, comprising a pail, a pipe extending into the pail for conducting dust-laden air into the same, and a dust separating device connected with the pipe and submerged in the pail, said device comprising a plurality of cylinders in nested relation and having ported walls, whereby air can pass through the water from one cylinder to another to arrest the dust by the water, and a cover for removably closing the tops of the cylinders.

2. A portable dust separator for vacuum cleaners, comprising a pail, a pipe extending into the pail for conducting dust-laden air into the same, and a dust separating device connected with the pipe and submerged in the pail, said device comprising a plurality of cylinders in nested relation and having ported walls, whereby air can pass through the water from one cylinder to another to arrest the dust by the water, a cover slidable on the pipe for closing the cylinders, and spring means for yieldingly holding the cover closed.

3. In a dust separator, the combination of a pipe for conducting dust-laden air, with a separating device connected with the pipe, said device comprising a plurality of nested chambered bodies adapted to be submerged in water and having ports in their walls through which air passes through the water from one body to another, a plate forming a cover for the bodies and held in place by the pipe, and a frame fastened to the pipe and to which the bodies are fastened for holding the bodies in fixed spaced relation.

4. In a dust separator, the combination of a pipe for conducting dust-laden air, with a separating device connected with the pipes, said device comprising a plurality of nested chambered bodies adapted to be submerged in water and having ports in their walls through which air passes through the water from one body to another, a plate forming a cover for the bodies, said cover being slidable on the pipe, and spring means for holding the cover yieldingly in closed position.

ROBT. WHITING RIORDAN.

Witnesses:
R. H. WILSON,
H. A. OPPEL.